(12) United States Patent
Miyoshi

(10) Patent No.: US 7,840,345 B2
(45) Date of Patent: Nov. 23, 2010

(54) POSITIONAL INFORMATION USE APPARATUS

(75) Inventor: Masahiro Miyoshi, Kuwana (JP)

(73) Assignee: DENSO CORPORATION, Kariya (JP)

( * ) Notice: Subject to any disclaimer, the term of this patent is extended or adjusted under 35 U.S.C. 154(b) by 721 days.

(21) Appl. No.: 11/798,067

(22) Filed: May 10, 2007

(65) Prior Publication Data

US 2008/0010009 A1   Jan. 10, 2008

(30) Foreign Application Priority Data

Jul. 4, 2006   (JP)   ............................. 2006-184594

(51) Int. Cl.
*G01C 21/30* (2006.01)

(52) U.S. Cl. .............. 701/208; 340/995.28; 340/593.13

(58) Field of Classification Search ................ 701/208, 701/117, 207; 340/995.13, 988, 995.28, 340/593.13; *G01C 21/26, 21/30*
See application file for complete search history.

(56) References Cited

U.S. PATENT DOCUMENTS

| | | | | |
|---|---|---|---|---|
| 4,608,656 A | * | 8/1986 | Tanaka et al. | ................ 701/212 |
| 4,672,565 A | * | 6/1987 | Kuno et al. | .................... 702/92 |
| 4,673,878 A | * | 6/1987 | Tsushima et al. | ............ 324/226 |
| 4,862,398 A | * | 8/1989 | Shimizu et al. | ................ 702/93 |
| 5,283,743 A | * | 2/1994 | Odagawa | ..................... 701/224 |
| 5,297,050 A | * | 3/1994 | Ichimura et al. | ............ 701/208 |
| 5,374,933 A | * | 12/1994 | Kao | ...................... 342/357.13 |
| 5,588,733 A | * | 12/1996 | Gotou | ........................... 362/37 |
| 5,731,978 A | * | 3/1998 | Tamai et al. | ................. 701/201 |
| 6,853,899 B2 | * | 2/2005 | Kobayashi | .................... 701/49 |
| 2003/0132862 A1 | * | 7/2003 | Kurosawa | ................ 340/995.1 |
| 2006/0129316 A1 | * | 6/2006 | Park | ........................... 701/211 |
| 2006/0287818 A1 | * | 12/2006 | Okude et al. | ................. 701/209 |
| 2007/0021912 A1 | * | 1/2007 | Morita et al. | ................ 701/211 |
| 2009/0037101 A1 | * | 2/2009 | Koike et al. | ................. 701/209 |

FOREIGN PATENT DOCUMENTS

| | | |
|---|---|---|
| JP | A-7-063568 | 3/1995 |
| JP | A-2002-257579 | 9/2002 |
| JP | A-2004-045291 | 2/2004 |
| JP | A-2004/286653 | 10/2004 |
| JP | A-2005-221781 | 8/2005 |
| JP | A-2005-338032 | 12/2005 |

* cited by examiner

*Primary Examiner*—Tuan C To
(74) *Attorney, Agent, or Firm*—Posz Law Group, PLC

(57) ABSTRACT

A vehicular swept path processor and a map matching processor calculate a current position of a subject vehicle. A gyro sensor and a steering sensor output detection signals. A POI recognition processor makes a determination as to whether the vehicle stopped off at a POI or not based on the calculated current position and the outputted detection signals. When the determination is affirmatively made, i.e., the vehicle is determined to have stopped off at the POI, the POI recognition processor calculates a recognition confidence degree relative to an accuracy in the determination. A vehicle control ECU controls an in-vehicle device such that the in-vehicle device performs a predetermined operation corresponding to the POI in a mode according to the calculated recognition confidence degree.

11 Claims, 6 Drawing Sheets

EVALUATION VALUES

| USER EVALUATION | 1 | 2 | 3 | 4 | ⑤ |
| --- | --- | --- | --- | --- | --- |
| MAP ACCURACY | 1 | 2 | 3 | 4 | ⑤ |
| GPS RECEPTION | 1 | 2 | 3 | 4 | ⑤ |

EVALUATION VALUES

| USER EVALUATION | 1 | ② | 3 | 4 | 5 |
| --- | --- | --- | --- | --- | --- |
| MAP ACCURACY | 1 | 2 | 3 | ④ | 5 |
| GPS RECEPTION | 1 | 2 | ③ | 4 | 5 |

POSITIONAL INFORMATION USE APPARATUS

CROSS REFERENCE TO RELATED APPLICATION

This application is based on and incorporates herein by reference Japanese Patent Application No. 2006-184594 filed on Jul. 4, 2006.

FIELD OF THE INVENTION

The present invention relates to a technology for accurately recognizing a vehicle's stop-off at a spot or a POI (Point Of Interest) and thereby controlling the vehicle based on a confidence degree in recognition of the stop-off at the spot.

BACKGROUND OF THE INVENTION

Patent document 1 discloses a navigation system, which stores information on POIs such as a gas station, convenience store, or the like as POI data and provides a user with the stored information on POIs.

Patent document 2 discloses a technology, which accurately locates a site where a POI is present and provides the located site of the POI for a use.

Patent document 1: JP-A-2004-286653
Patent document 1: JP-A-2005-338032

The above-mentioned POI data may be used for controlling a vehicle or in-vehicle device; namely, a certain vehicle control process may be activated when the vehicle stops off at a certain POI. When a vehicle stops off at a gas station, the following vehicle control processes take place according to the corresponding POI: (i) Operation of automatically opening a fuel lid (or filler cap) or (ii) Operation of automatically resetting a trip meter. Further, whether the foregoing operation should be automatically executed or not is automatically asked a user and the foregoing operation is executed based on the response from the user.

To achieve an operation triggered or activated when the vehicle stops off at a POI, a stop-off at a POI needs to be accurately recognized.

To recognize a stop-off at a POI by a navigation system, positional information on POI and a vehicular swept path may be simply compared to each other. For instance, the positional information on POI is indicated by a longitude and latitude, a geographical range, or the like; the vehicular swept path may be calculated from both satellite measurement using GPS, and autonomous navigation.

However, the swept paths computed from the satellite measurement and the autonomous navigation have errors, so stop-off at a POI may not be accurately recognized by simply comparing the positional information on POI with the swept path.

SUMMARY OF THE INVENTION

It is an object of the present invention to provide a technology for accurately recognizing stop-off at a spot or a POI and performing a vehicle control process, which is triggered or activated when the vehicle stops off at the spot or POI.

To achieve the above object, according to an aspect of the present invention, a positional information use apparatus for a vehicle is provided as follows. A position calculation unit calculates a current position of the vehicle. A POI storing unit is configured to store POI positional information on a position of a Point Of Interest (POI). An acquisition unit is configured to acquire state information on a change in a heading direction of the vehicle. An area determination unit is configured to make an area determination, based on the calculated current position, as to whether the vehicle is present within a predetermined stop-off determination area, which is defined based on the stored POI positional information, for determining a stop-off of the vehicle at the POI. A stop-off determination unit is configured to make a stop-off determination, based on the acquired state information, as to whether the vehicle stops off at the POI when the area determination is affirmatively made.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS (Configuration of Navigation Apparatus)

Figure 1:
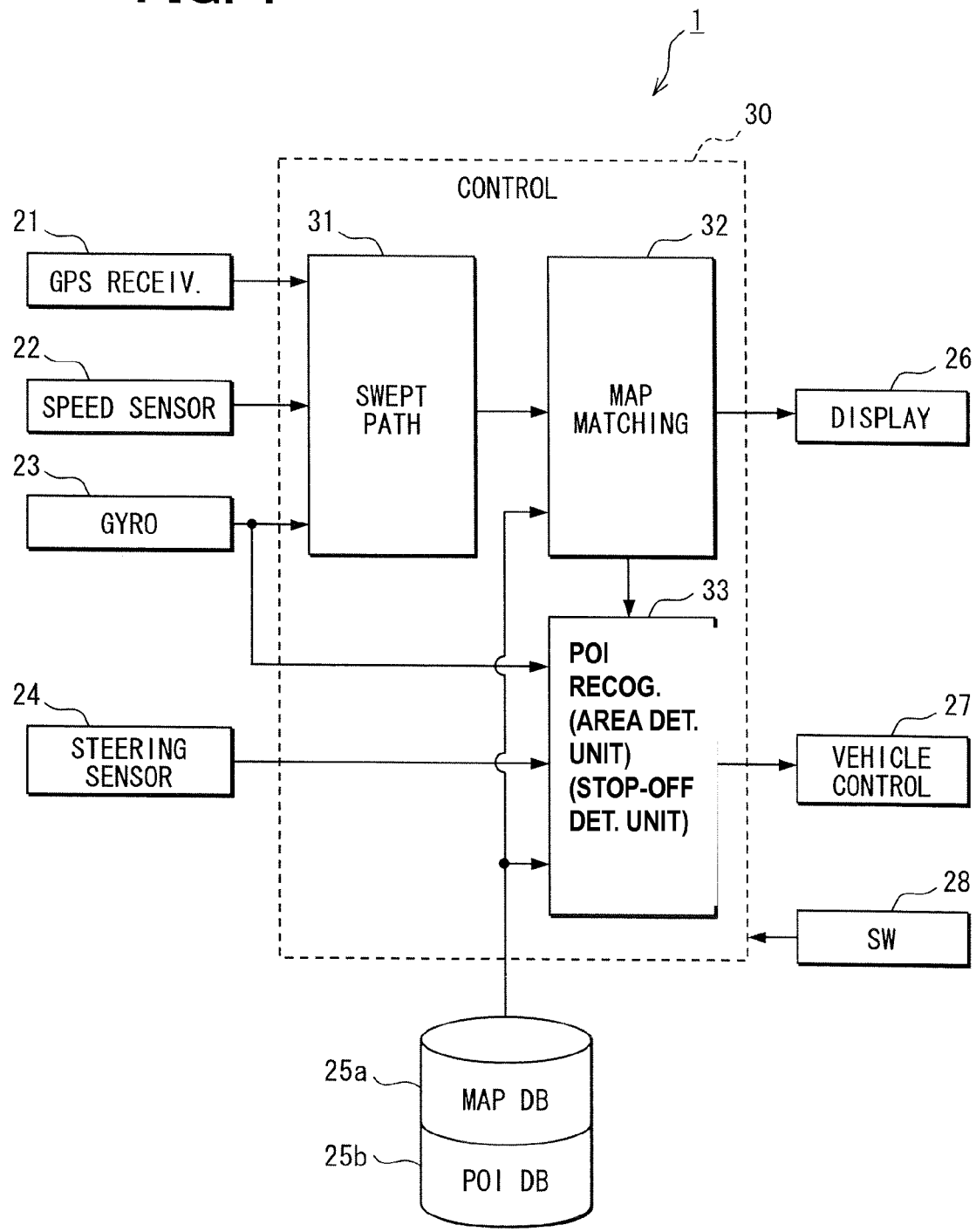
FIG. 1 is a diagram illustrating an overall configuration of a navigation apparatus according to an embodiment of the present invention.

A navigation apparatus 1 according to an embodiment of the present invention will be explained below. FIG. 1 shows a configuration of the navigation apparatus 1 mounted in a subject vehicle.

The navigation apparatus 1 includes a GPS receiver 21, a speed sensor 22, a gyro sensor 23, a steering sensor 24, a map database 25a, a POI database 25b, a display 26, a vehicle control ECU (Electronic Control Unit) 27, an operation switch group 28, and a control unit 30.

The GPS receiver 21 receives transmission electric waves from artificial satellites for GPS (Global Positioning System) via an antenna to detect a position of the vehicle. The speed sensor 22 outputs a detection signal based on a speed of the vehicle. The gyro sensor 23 outputs a detection signal based on an acceleration of rotational movement of the vehicle. The steering sensor 24 outputs a detection signal based on an operation direction or amount of the steering wheel.

The map database 25a stores a variety of map data such as road data or map matching data. The road data include link information, node information, and information on connection between links. The map matching data is used for enhancing the accuracy of the position detection.

The link information include, with respect to each of links, a link ID, a link class, coordinates of a starting and ending points, and a link length. The link class includes one of an expressway, toll road, general road, or the like. The node information include, with respect to each of nodes, a node ID, and coordinates of a longitude and a latitude.

The POI database 25b include, with respect to each of spots (i.e., POIs (Points Of Interest)), class information (e.g., gas station, parking structure), data on position coordinates, data on a link the POI adjoins, data on a range of an area (stop-off determination area) for determining stop-off of the vehicle, data on accuracy in a map in proximity of the POI, data on a value of user evaluation for stop-off recognition, and the like.

The map database 25a and POI database 25b use a storage medium such as a hard disk, DVD-ROM, CD-ROM, semiconductor memory, or the like.

The display 26 is a color display unit, which can use a liquid crystal display, a plasma display, or a CRT. The screen of the display 26 shows a mark of a current position of the vehicle, a map surrounding the current position, names or symbols of facilities on the map, or the like, which are superimposed on each other.

The vehicle control ECU 27 includes a microcomputer and performs a vehicle control process. In this process, in-vehicle devices are activated via a communication line such as an in-vehicle LAN (Local Area Network) based on POI stop-off recognition information, a corresponding recognition confidence degree, and the like, all of which are inputted from the control unit 30.

The following are examples of the vehicle control processes, in which the vehicle control ECU 27 controls an in-vehicle device. For instance, when it is determined that the vehicle stops off at a gas station, a fuel lid opener is activated to open a lid (or cap) of a filler opening, and/or a trip meter is reset. Thus, the vehicle control ECU 27 controls an in-vehicle device corresponding to the POI at which the vehicle stops off.

The operation switch group 28 is used for a user to input various instructions; it uses a touch-sensitive panel integrated in the display 26 to be provided on a screen, or mechanical key switches surrounding the display 26.

The control unit 30 includes a known microcomputer having a CPU, ROM, RAM, I/O, and bus line connecting the foregoing components. The control unit 30 performs various processes based on programs stored in the ROM or the like.

For instance, the control unit 30 performs navigation such as a map display process, route guide process, or the like. In the map display process, a current position of the vehicle is calculated as a pair of coordinates and a heading direction based on a detection signal from the GPS receiver 21, speed sensor 22, and gyro sensor 23; then, a map surrounding the computed current position is read from the map database 25a and displayed on the display 26. In the route guide process, an optimum route from the current position to a destination is computed based on (i) data stored in the map database 25a and (ii) the destination which is designated by input operation via the operation switch group 28. Then, a travel guide is performed along the computed route. The method for automatically designating an optimum route is, for instance, a cost calculation using the Dijkstra method.

In parallel with the above map display process or route guide process, the control unit 30 recognizes a stop-off at a POI and then perform "POI stop-off recognition process" to notify the vehicle control ECU 27 of given information on POI stop-off recognition.

The control unit 30 includes a vehicular swept path processor 31, a map matching processor 32, and a POI recognition processor 33, for performing current position calculation or the POI stop-off recognition process.

The vehicular swept path processor 31 computes a vehicular swept path of the subject vehicle based on a detection signal from the GPS receiver 21, speed sensor 22, and gyro sensor 23.

The map matching processor 32 reads map data or the like from the map database 25a to thereby match the swept path computed by the vehicular swept path processor 31 on a road on the map and compute a current position of the vehicle on the road.

In the POI stop-off recognition process, the POI recognition processor 33 performs the following: recognizing a vehicle's stop-off at a POI; calculating a confidence degree in the recognition of the stop-off at the POI; and then transmitting a stop-off report to the vehicle control ECU 27. Here, the vehicle's stop-off at a POI is recognized based on (i) a detection signal from the gyro sensor 23 and steering sensor 24, (ii) various information read from the map database 25a and POI database 25b, and (iii) the current position calculated by the map matching processor 32. The stop-off report transmitted to the vehicle control ECU 27 includes given information notifying that the vehicle has stopped off at a POI, and data on a confidence degree (called a recognition confidence degree) in the recognition of the stop-off at the POI. The POI stop-off recognition process will be explained in detail later.

(Functions)

As explained above, the GPS receiver 21, speed sensor 22, gyro sensor 23, vehicular swept path processor 31, and map matching processor 32 may serve as a position calculation unit or means. The map database 25a may serve as a map data storing unit or means. The POI database 25b may serve as a POI storing unit or means. The gyro sensor 23 and steering sensor 24 may serve as an acquisition unit or means. The POI recognition processor 33 may serve as an area determination unit or means, a stop-off determination unit or means, a confidence degree calculation unit or means, and an evaluation reception unit or means. Further, the vehicle control ECU 27 may serve as an in-vehicle device control unit or means.

(POI Stop-Off Recognition Process)

The POI stop-off recognition process will be explained with reference to FIGS. 4 to 6.

Figure 2:
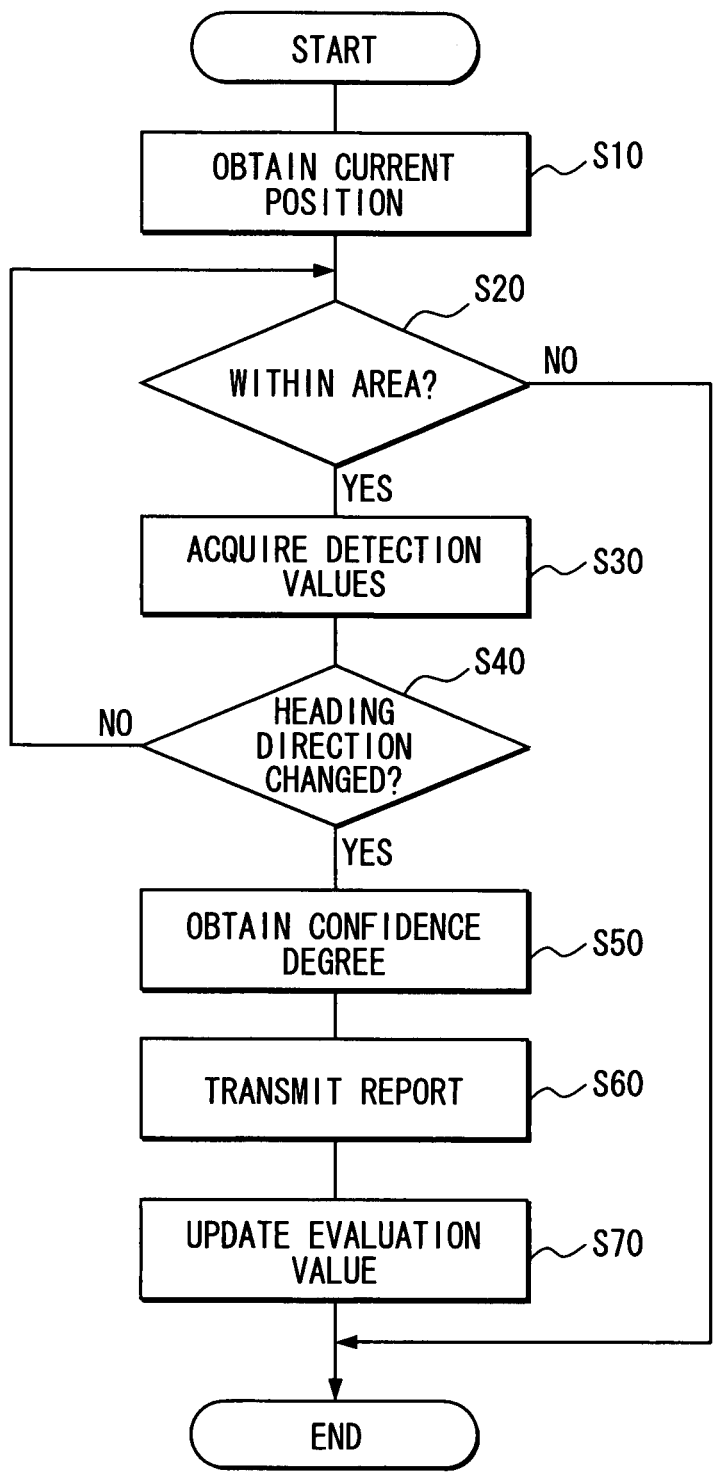
FIG. 2 is a flowchart diagram illustrating a POI stop-off recognition process.

FIG. 2 shows a flowchart of main part of the POI stop-off recognition process by the POI recognition processor 33 of the control unit 30.

The POI recognition processor 33 acquires a current position (called a map-matched current position) of the vehicle after the map matching process, from the map matching processor 32 (Step S10).

Then, the POI recognition processor 33 determines whether the vehicle is present within an area for determining a stop-off at a POI (called a stop-off determination area), based on the map-matched current position and various information from the map database 25a and POI database 25b (Step S20). The stop-off determination area is defined on a link which the corresponding POI adjoins.

Here, Step S20 will be explained in detail with reference to FIGS. 4, 5.

Figure 4:
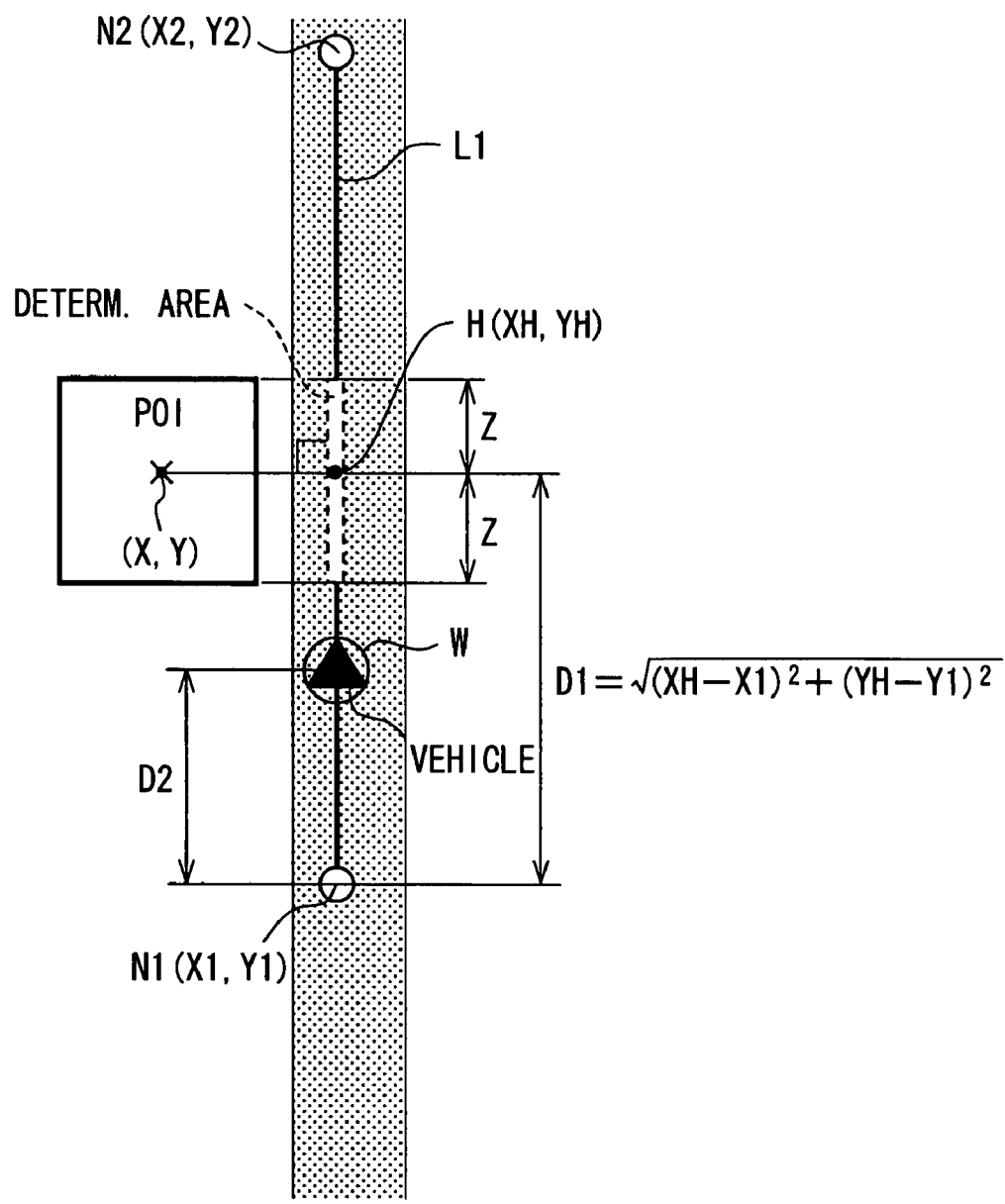
FIG. 4 is a view schematically illustrating a method for detecting a vehicle entering a stop-off determination area.

FIG. 4 schematically illustrates a detection method for detecting that the vehicle enters a stop-off determination area designated on a link the POI adjoins.

In FIG. 4, the POI is present to adjoin a link L1, which has nearby nodes N1, N2 in both the ends. It is assumed that the vehicle runs from the nearby node N1 to the nearby node N2.

During Step S20, a stop-off determination area is designated on a link L1 adjoined by the POI. This stop-off determination area is defined as a sectional range of the link L1 having a distance $\pm Z$ from a center H of coordinates (XH, YH), which is an intersection H between the link L1 and a line perpendicular to the link L1 from the coordinates (X, Y) of the POI. The distance Z may be unique to each POI or common in all POIs. Alternatively, a stop-off determination area may be previously registered with respect to each POI in the POI database 25b.

Here, it is determined that the vehicle passes through the nearby node N1, based on the map-matched current position. In this case, a position of the vehicle is obtained on the link L1 relative to the nearby node N1 and it is then determined whether the vehicle is present in the stop-off determination area based on the obtained relative position.

For instance, Position W departed from the node N1 by a travel distance D2 is defined as the relative position on the link L1 based on the node N1. The travel distance D2 is calculated by time integration of the speed of the vehicle after passing through the node N1. A difference is calculated between D2 and D1, which is a distance from the node N1 to the intersection H. When the absolute value of the difference is less than Z, it is determined that the vehicle is within a stop-off determination area.

When the vehicle travels from the node N2 to the node N1, whether the vehicle is present within the stop-off determination area is determined based on a position calculated relative to the node N2, similarly.

Figures 5, 6A, 6B:
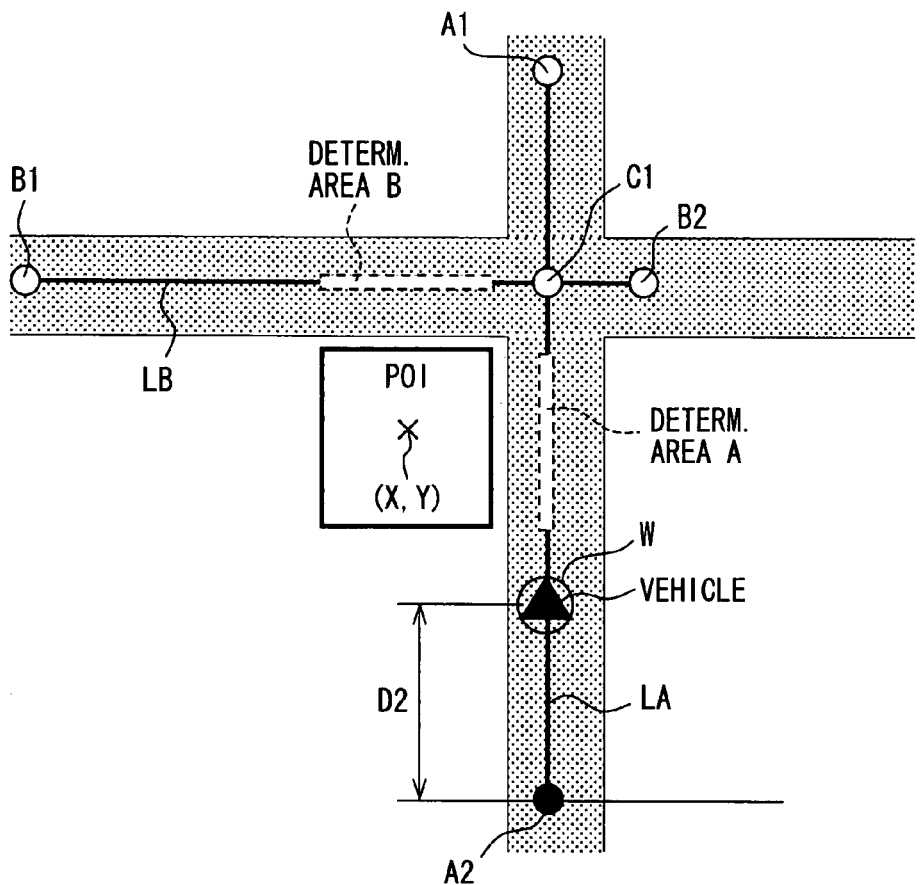
FIG. 5 is a view schematically illustrating another method for detecting a vehicle entering a stop-off determination area.
FIGS. 6A, 6B are diagrams illustrating examples of recognition confidence degrees.

In contrast, FIG. 5 illustrates a view in which a POI adjoins an intersection C1 formed by a link LA and a link LB; further, the link LA has nodes A1, A2 in its both ends while the link LB has nodes B1, B2 in its both ends.

As shown in FIG. 5, stop-off determination areas A, B are designated on the individual links LA, LB. When the vehicle travels the link LA from the node A2 to the node C1 or A1, whether the vehicle is present within the stop-off determination area A based on a relative position based on the node A2. Alternatively, when the vehicle travels the link LA from the node A1 to the node A2, whether the vehicle is present within the stop-off determination area A based on a relative position based on the node A1.

In contrast, when the vehicle travels the link LB from the node B1 (or B2) to the node B2 (or B1), whether the vehicle is present within the stop-off determination area B based on a relative position based on the node B1 (or B2).

Now, the explanation returns to the flowchart in FIG. 2. When it is determined that the vehicle is not present within the stop-off determination area (Step S20: NO), the POI stop-off recognition process ends.

When it is determined that the vehicle is present within the stop-off determination area (Step S20: YES), detection values are acquired from the gyro sensor 23 and steering sensor 24 (Step S30). Based on the acquired detection values, it is determined whether both the magnitude of the acceleration of the rotation movement of the vehicle towards the position of the POI and the operation amount of the steering wheel exceed individual predetermined values (Step S40).

Here, the above determination at Step S40 may be performed only by using either the gyro sensor 23 or steering sensor 24; further, it may be performed further in consideration of information on a direction indicator as information indicating a heading direction of the vehicle.

It is determined that at least one of (i) the magnitude of the acceleration of the rotation movement of the vehicle towards the position of the POI and (ii) the operation amount of the steering wheel does not exceed the corresponding predetermined value (Step S40: NO), Step S20 is performed again.

In contrast, it is determined that both (i) the magnitude of the acceleration of the rotation movement of the vehicle towards the position of the POI and (ii) the operation amount of the steering wheel exceed the individual predetermined values (Step S40: YES), it is recognized that the vehicle stops off at the POI and then a recognition confidence degree with respect to recognition accuracy is obtained (Step S50).

In this embodiment, the recognition confidence degree is evaluated by using evaluation values ranging from 1 to 5 in respect to three parameters such as a user evaluation, a position calculation accuracy (map accuracy), and a position calculation accuracy (GPS reception strength).

The user evaluation is data of an accumulation of user's evaluation with respect to accuracy in past stop-off recognition for the corresponding POI and stored in the POI database 25b.

At Step S50, a user evaluation corresponding to a POI, at which the stop-off is recognized, is read from the POI database 25b as an evaluation value of the confidence degree.

Each time it is recognized that the vehicle stops off at a certain POI, a user inputs whether the recognition is correct or not. The user evaluation increases by one each time a user inputs "correct"; otherwise, it decreases by one each time "not correct." The user evaluation value varies in a range from "1" as an initial value to "5" as a maximum value. Therefore, the user evaluation is updated each time a stop-off at the corresponding POI is recognized, which allows an accumulation of the most recent evaluation in the recognition accuracy.

The position calculation accuracy (map accuracy) is an index indicating an accuracy of a map for map matching in proximity of the corresponding POI. The evaluation values range from 1 to 5. In general, as an error in a map for map matching increases, an error in a current position calculated by the map matching increases. As an error in the map decreases, an error in the current position calculated decreases. Therefore, information on accuracy in the map is used for evaluating an accuracy in calculation for a current position.

In particular, the POI database 25b stores map accuracies in proximity of POIs. Based on the stored map accuracies, each evaluation value is calculated as follows. When an error is within a (m), the evaluation value is "5." When within a range from a (m) to b (m), "4." When within a range from b (m) to c (m) (note: a<b<c), "3." Namely, as an error increases, the computed value decreases in a range from 5 to 1 as an evaluation value for the map accuracy.

The position calculation accuracy (GPS reception strength) is an index indicating a reception strength of satellite electrical waves in the GPS receiver 21. The evaluation values range from 1 to 5. In general, as a reception strength of GPS increases, an accuracy in the satellite position measurement increases. As a reception strength of GPS decreases, an accuracy in the satellite position measurement decreases. Therefore, information on the reception strength of GPS is used for evaluating an accuracy in calculation for a current position.

In particular, based on a reception strength in the GPS receiver 21, each evaluation value is calculated as follows. When a reception strength is equal to or greater than $\alpha$(dB), the evaluation value is "5." When within a range from $\alpha$(dB) to $\beta$(dB), "4." When within a range from $\beta$(dB) to $\gamma$(dB) (note: $\alpha > \beta > \gamma$), "3." Namely, as the reception strength increases, the computed value increases in a range from 1 to 5 as an evaluation value for the position calculation accuracy (GPS reception strength).

Further, various indexes related to accuracies of satellite measurements may be used for evaluating a position calculation accuracy. For instance, Dilution Of Precision (DOP) in conjunction of arrangements of GPS satellites can be substituted for the GPS reception strength or signal.

FIGS. 6A, 6B show examples of recognition confidence degrees with three parameters: a user evaluation, a position calculation accuracy (map accuracy), and a position calculation accuracy (GPS reception strength), using evaluation values from 1 to 5.

FIG. 6A shows that the confidence degrees in all three parameters have the maximum values of 5.

FIG. 6B shows an example of the user evaluation having a value of 2, the map accuracy having a value of 4, and the GPS reception strength having a value of 3.

Now, the explanation returns to the flowchart in FIG. 2. After the recognition confidence degree is obtained at Step S50, the POI recognition processor 33 transmits a stop-off report to the vehicle control ECU 27 (Step S60). Here, the stop-off report includes POI stop-off recognition information and the recognition confidence degree obtained at Step S50. Further, the POI stop-off recognition information includes necessary information such as information on the corresponding POI recognized as a stop-off POI. A stop-off POI is defined as a POI at which the vehicle stopped off.

Next, the user is prompted to evaluate a stop-off recognition for the corresponding POI via a message, which is displayed on the display 26 or outputted via a speaker (not shown). The user responds to the message via the operation switch group 28. Thus, the resultant user's evaluation for the corresponding POI is updated (Step S70).

In particular, a message queries the user about success/failure in the stop-off recognition. When the user indicates that the stop-off recognition is correct or successful, the value of the user evaluation is incremented by one. When the user indicates that the stop-off recognition is incorrect or unsuccessful, the value of the user evaluation is decremented by one.

Further, when a POI stop-off is recognized, another message is automatically outputted to ask a user to want a certain vehicle control process. For instance, when a user arrives at a gas station, the user is asked whether a fuel lid should be opened, or whether a trip meter should be reset. In this case, when the user inputs an affirmative instruction, the value of the user evaluation is increased by one. When the user inputs a negative instruction, the value of the user evaluation is decreased by one.

(Vehicle Control Process)

Figure 3:
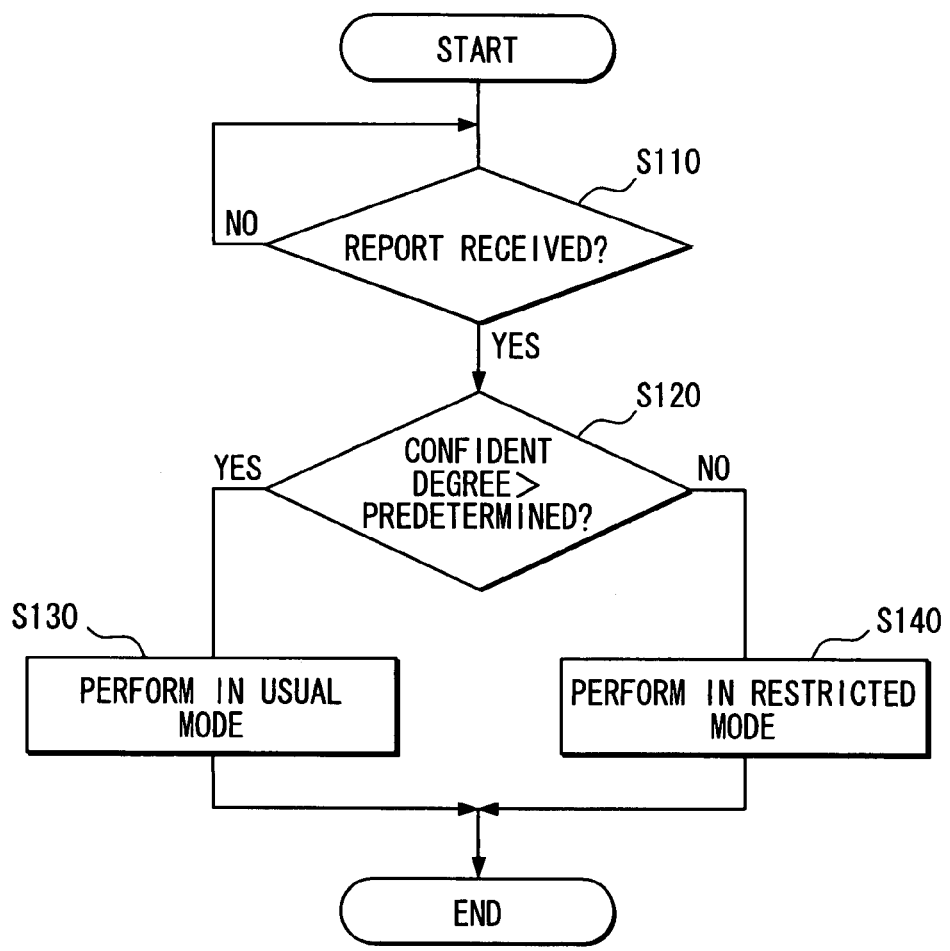
FIG. 3 is a flowchart diagram illustrating a vehicle control process.

FIG. 3 shows a flowchart of a main part of a vehicle control process performed by the vehicle control ECU 27.

After the vehicle control process starts, the vehicle control ECU 27 determines whether a stop-off report including (i) POI stop-off recognition information and (ii) a corresponding recognition confidence degree is received or not from the POI recognition processor 33 (Step S110). The stop-off report is transmitted at Step S60 in FIG. 2. While the stop-off report is not received (Step S110: NO), Step S110 is repeated.

When the stop-off report is received (Step S120: YES), it is determined based on the report whether a recognition confidence degree is equal to or greater than a predetermined value (Step S120).

When the recognition confidence degree is equal to or greater than the predetermined value (Step S120: YES), an in-vehicle device corresponding to the POI is controlled in a usual operation mode (Step S130). In contrast, when the recognition confidence degree is not equal to or greater than the predetermined value (Step S120: NO), an in-vehicle device corresponding to the POI is controlled in a restricted operation mode (Step S140).

For instance, when all the evaluation values in all the three parameters have values of 5, as shown in FIG. 6A, a usual operation mode is selected for a vehicle control process.

Here, a usual operation mode is used when a recognition accuracy for a POI stop-off is assumed to be high. In the usual operation mode, user's convenience or availability is most prioritized and a vehicle control process for the vehicle or user can be performed with no restriction applied. For instance, when a stop-off at a gas station is recognized, a fuel lid opener is activated to open a fuel lid and a trip meter is reset.

In contrast, when a certain evaluation value in one of the three parameters is less than a value of 5 as a predetermined value, as shown in FIG. 6B, a restricted operation mode is used for a vehicle control process.

Here, a restricted operation mode is used when a recognition accuracy for a POI stop-off is assumed to be low. In the restricted operation mode, reliability of a vehicle control process is most prioritized and a vehicle control process may be performed with restriction applied. For instance, when a stop-off at a gas station is recognized, the user is queried about whether a fuel lid opener should be activated to open a fuel lid and/or whether a trip meter should be reset. Only when the user inputs permission or affirmative instruction, the corresponding vehicle control process is started.

Further, when the recognition confidence degree is significantly low, any vehicle control process corresponding to the stop-off POI may be not activated.

(Effects)

Figure 7:
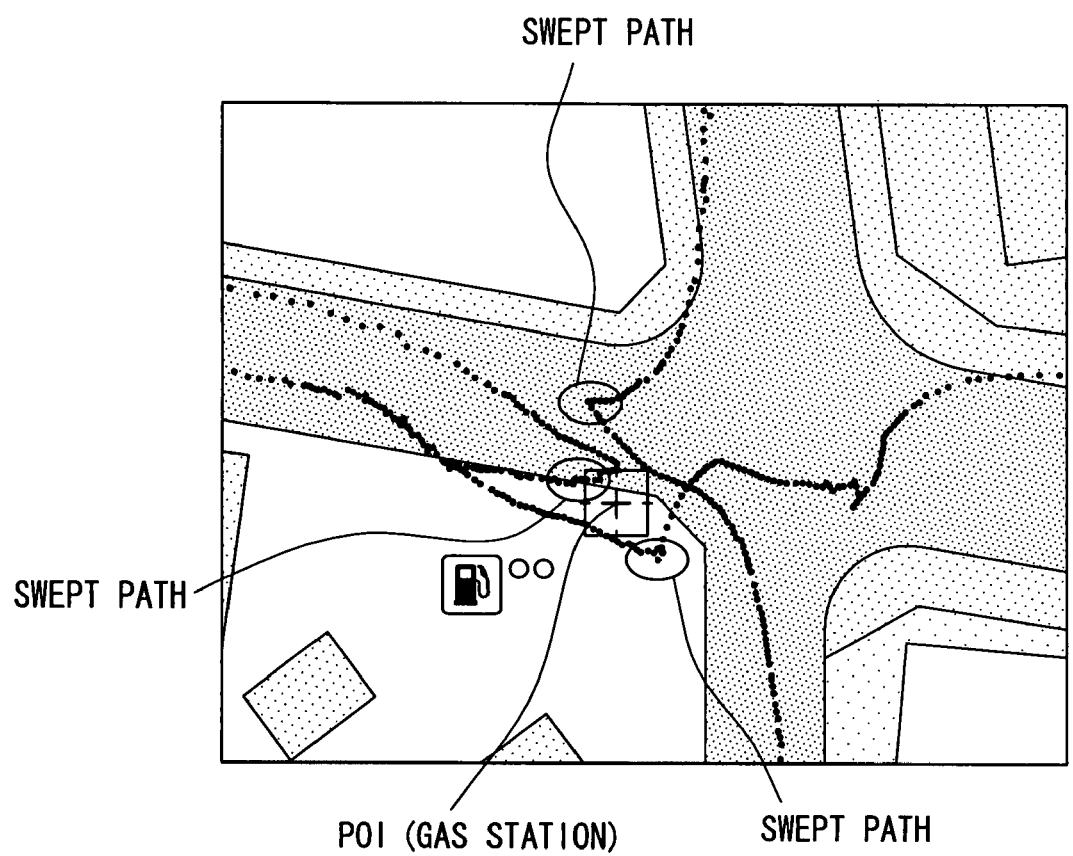
FIG. 7 is a view illustrating a comparative example, in which multiple swept paths plotted on a map when a vehicle stopped at a gas station in multiple times.

FIG. 7 shows a comparative example, which illustrates multiple swept paths plotted on a map when a vehicle stopped off at a gas station in multiple times. As shown in FIG. 7, even though the vehicle actually stopped off at the gas station, some swept paths do not indicate that the vehicle stopped off at the gas station. This exhibits a difficulty in an accurate recognition of stop-off at a POI obtained by simply comparing the positional information on POI and the swept path to each other.

In contrast, in the above embodiment, the recognition of a POI stop-off is made not only based on information on a current position computed with satellite measurements and autonomous navigation, but also in consideration of a change in a vehicle's heading direction occurring when the vehicle approaches a POI. This allows an accurate recognition of a POI stop-off compared with a case where the positional information of a POI and swept path are simply compared with each other.

Further, a current position of the vehicle is matched on a road on a map with the map matching process. A stop-off determination area is designated on a link adjacent to a POI. Then, a stop-off is determined based on relative positional relation between the stop-off determination area and the current position. This procedure allows more accurate recognition of a POI stop-off.

A vehicle control process is performed according to a recognition confidence degree with respect to a POI stop-off. This allows a vehicle control process to be achieved in a flexible manner with consideration of users availability or convenience.

The recognition confidence degree is evaluated using multiple parameters such as a user evaluation, a position calculation accuracy (map accuracy and GPS reception strength). Thus, a vehicle control process can be achieved in a manner considering the past user evaluation or error degrees in detecting positions.

(Modifications)

In the above explanation, target in-vehicle devices controlled by the vehicle control ECU 27 are a fuel lid opener or a trip meter. A target in-vehicle device is not limited to those, but may include a power window, a power roof, a power sheet, a wiper, a lamp, an electrical rear mirror, an air-conditioner, an audio, an electrical door-lock, or the like.

A vehicle control process according to a POI stop-off is not limited to a gas station operation in which a filler lid is opened and a trip meter is reset, but may also include another process or operation. For instance, when a vehicle enters an underground parking lot, a headlight is turned on, a window or roof is shut off, and/or a ventilator of an air-conditioner is switched to a room re-circulation mode. When a vehicle enters a drive-through restaurant, a window is opened and/or an audio volume is decreased. Various operations can be possible as a vehicle control process according to a POI stop-off.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As an aspect, a positional information use apparatus for a vehicle comprises: a position calculation unit configured to calculate a current position of the vehicle; a POI storing unit configured to store POI positional information on a position of a Point Of Interest (POI); an acquisition unit configured to acquire state information on a change in a heading direction of the vehicle; an area determination unit configured to make an area determination, based on the calculated current position, as to whether the vehicle is present within a predetermined stop-off determination area, which is defined based on the stored POI positional information, for determining a stop-off of the vehicle at the POI; and a stop-off determination unit configured to make a stop-off determination, based on the acquired state information, as to whether the vehicle stops off at the POI when the area determination is affirmatively made.

Here, when a vehicle approaches a facility as a POI from a road the vehicle has traveled, the vehicle is assumed to change a heading direction near the POI. Therefore, determining whether the vehicle stops off at the POI or not (i.e., a POI stop-off determination) is made based on not only the calculated current position but also a change in the heading direction. Thus, a stop-off at the POI can be more accurately recognized compared with a case where the current position and swept path are simply compared.

Further, a map matching process may be used to calculate a current position; namely, a current position obtained from the satellite measurement and autonomous navigation is matched to be present on a road on a map.

As an additional aspect of the above positional information use apparatus, a map data storing unit is included for storing map data. Here, the position calculation unit computes a current position matched to be present on a road based on the stored map data, and the area determination unit makes an area determination, based on the calculated current position present on the road, as to whether the vehicle is present within a predetermined stop-off determination area, which is defined on the road adjacent to the POI.

As an additional aspect of the above positional information use apparatus, an in-vehicle device control unit is included. The in-vehicle device control unit is communicative with an in-vehicle device and configured to control the in-vehicle device such that the in-vehicle device performs a predetermined operation corresponding to the POI when the stop-off determination is affirmatively made.

Thus, according to the recognition of a stop-off at the POI, a vehicle control process can be achieved based on the POI at which the vehicle stops off. Further, a reliability of the positional information use apparatus to control an in-vehicle device can be increased. For instance, when the accuracy in recognition of a stop-off at the POI is low, a vehicle control process at the stop-off can be limited according to the recognition confidence degree.

As an additional aspect of the above positional information use apparatus, a recognition confidence degree calculation unit is included to calculate a confidence degree in an accuracy in the affirmatively made stop-off determination. Here, the in-vehicle device control unit controls the in-vehicle device such that the in-vehicle device performs a predetermined operation corresponding to the POI according to the calculated recognition confidence degree.

Namely, when the recognition confidence degree is high, a predetermined vehicle control process can be performed without any restriction applied. When low, a predetermined vehicle control process can be performed with certain restriction applied. Thus, a vehicle control process can be performed in a flexible manner according to the recognition confidence degree.

As an additional aspect of the above positional information use apparatus, the confidence degree calculation unit evaluates an accuracy in calculation by the position calculation unit and then calculates the recognition confidence degree based on the evaluated accuracy.

Here, the recognition confidence degree in an accuracy for position calculation can be calculated based on an evaluation result for an element affecting an accuracy in calculating a current position, e.g., a reception strength of satellite electrical waves, a detection error of an in-vehicle sensor, an accuracy of map data used for the map matching process, or the like. When the error in the current position is low, the recognition confidence degree can be increased. When the error is high, the recognition confidence degree can be decreased.

Thus, a vehicle control process can be performed in an appropriate manner according to the estimated error degree of the current position.

As an additional aspect of the above positional information use apparatus, the POI storing unit stores a value of a user evaluation regarding a stop-off at a POI. Further, an evaluation reception unit is included to receive an evaluation relative to the affirmatively made stop-off determination and to change the stored value of the user evaluation based on the received evaluation. Here, the recognition confidence degree calculation unit calculates the recognition confidence degree based on the stored value of the user evaluation regarding the POI.

Thus, the user evaluation for the recognition of the stop-off at the POI is accumulated as a value of the user evaluation.

In other words, if the user affirmatively evaluated the recognition of a stop-off at the POI in the past, the recognition confidence degree is calculated in a high value. If the user negatively evaluated the recognition of a stop-off at the POI in the past, the recognition confidence degree is calculated in a low value. Thus, a vehicle control process can be performed in a flexible manner reflecting the user evaluation.

As another aspect, a method for determining a stop-off at a spot by a vehicle comprises the steps of: storing spot positional information on a position of a spot; calculating a current position of the vehicle; acquiring state information on a change in a heading direction of the vehicle; making an area determination, based on the calculated current position, as to whether the vehicle is present within a predetermined stop-off determination area, which is defined based on the stored spot positional information, for determining a stop-off of the vehicle at the spot; and making a stop-off determination, based on the acquired state information, as to whether the vehicle stops off at the spot when the area determination is affirmatively made.

It will be obvious to those skilled in the art that various changes may be made in the above-described embodiments of the present invention. However, the scope of the present invention should be determined by the following claims.

What is claimed is:

1. A positional information use apparatus for a vehicle, the apparatus comprising:
    a position calculation unit configured to calculate a current position of the vehicle;
    a POI storing unit configured to store POI positional information on a position of a Point Of Interest (POI);
    an acquisition unit configured to acquire state information on a change in a heading direction of the vehicle, the acquisition unit being a sensor configured to detect a heading direction of the vehicle;
    an area determination unit configured to make an area determination, based on the calculated current position, as to whether the vehicle is present within a predetermined stop-off determination area, which is defined based on the stored POI positional information, for determining a stop-off of the vehicle at the POI;
    a stop-off determination unit configured to make a stop-off determination, based on the acquired state information on the change in the heading direction of the vehicle, as to whether the vehicle stops off at the POI when the area determination is affirmatively made;
    a confidence degree calculation unit configured to calculate a confidence degree in an accuracy in the affirmatively made stop-off determination by evaluating at least one predetermined parameter for confidence evaluation; and
    an in-vehicle device control unit communicative with an in-vehicle device and configured to control the in-vehicle device according to the calculated confidence degree such that the in-vehicle device performs a predetermined operation corresponding to the POI when the stop-off determination is affirmatively made and the calculated confidence degree shows the accuracy but not when the stop-off determination is affirmatively made and the confidence degree does not show the accuracy.

2. The positional information use apparatus of claim 1, further comprising:
    a map data storing unit configured to store map data, wherein
    the position calculation unit computes a current position matched to be present on a road based on the stored map data, and
    the area determination unit makes an area determination, based on the calculated current position present on the road, as to whether the vehicle is present within a predetermined stop-off determination area, which is defined on the road adjacent to the POI.

3. The positional information use apparatus of claim 1, wherein
    the confidence degree calculation unit evaluates, as the predetermined parameter for confidence evaluation, an accuracy in calculation by the position calculation unit and then calculates the confidence degree based on the evaluated accuracy.

4. The positional information use apparatus of claim 1, wherein the POI storing unit stores a value of a user evaluation regarding the POI, the user evaluation regarding the POI being the predetermined parameter for confidence evaluation evaluated by the confidence degree calculation unit,
    the apparatus further comprising:
    an evaluation reception unit configured to receive an evaluation relative to the affirmatively made stop-off determination and to change the stored value of the user evaluation based on the received evaluation, wherein
    the confidence degree calculation unit calculates the confidence degree based on the stored value of the user evaluation regarding the POI.

5. The positional information use apparatus of claim 1, wherein
    the stop-off determination unit is further configured to make a stop-off determination as to whether the vehicle stops off at the POI when the area determination is affirmatively made, by determining that the sensor for detecting the heading direction of the vehicle outputs a detection value exceeding a predetermined value.

6. The positional information use apparatus of claim 5, wherein
    the sensor for detecting the heading direction of the vehicle includes a gyro sensor which outputs a detection signal based on acceleration of rotational movement of the vehicle;
    the stop-off determination unit makes the stop-off determination as to whether the vehicle stops off at the POI when the area determination is affirmatively made,
    when a magnitude of the acceleration of the rotational movement of the vehicle towards the position of the POI detected by the gyro sensor exceeds the predetermined value.

7. The positional information use apparatus of claim 5, wherein
    the sensor for detecting the heading direction of the vehicle includes a steering sensor which outputs a detection signal based on an operation amount of a steering wheel of the vehicle,
    the stop-off determination unit makes the stop-off determination as to whether the vehicle stops off at the POI when the area determination is affirmatively made, when an operation amount of the steering wheel detected by the steering sensor exceeds the predetermined value.

8. The positional information use apparatus of claim 3, wherein
    the accuracy in calculation by the position calculation unit as the predetermined parameter for confidence evaluation which the confidence degree calculation unit evaluates is a map accuracy, which is an index indicating an accuracy of a map for map matching in proximity of the corresponding POI.

9. The positional information use apparatus of claim 3, wherein
    the accuracy in calculation by the position calculation unit as the predetermined parameter for confidence evaluation which the confidence degree calculation unit evaluates is a GPS reception strength, which is an index indicating a reception strength of a satellite electrical wave in a GPS receiver in the vehicle.

10. The positional information use apparatus of claim 1, wherein the in-vehicle device control unit is further configured to selectively control the in-vehicle device between in a usual mode and in a restricted mode by determining whether the calculated confidence degree in the accuracy in the affirmatively made stop-off determination by evaluating the predetermined confidence evaluation parameter is greater than a predetermined value, the usual mode being executed when the calculated confidence degree is equal to or greater than the predetermined value, the restricted mode being executed when the calculated confidence degree is less than the predetermined value.

11. A method for controlling an in-vehicle device in a vehicle when determining a stop-off at a spot of the vehicle, comprising the steps of:

storing spot positional information on a position of a spot;

calculating a current position of the vehicle;

acquiring state information on a change in a heading direction of the vehicle by using a sensor configured to detect a heading direction of the vehicle;

making an area determination, based on the calculated current position, as to whether the vehicle is present within a predetermined stop-off determination area, which is defined based on the stored spot positional information, for determining a stop-off of the vehicle at the spot;

making a stop-off determination, based on the acquired state information on the change in the heading direction of the vehicle, as to whether the vehicle stops off at the spot when the area determination is affirmatively made;

calculating a confidence degree in an accuracy in the affirmatively made stop-off determination by evaluating at least one predetermined parameter for confidence evaluation; and controlling an in-vehicle device according to the calculated confidence degree such that the in-vehicle device performs a predetermined operation corresponding to the POI when the stop-off determination is affirmatively made and the calculated confidence degree shows the accuracy but not when the stop-off determination is affirmatively made and the confidence degree does not show the accuracy.

* * * * *